United States Patent [19]

Shimosaka et al.

[11] 3,755,248

[45] Aug. 28, 1973

[54] POLYPIVALOLACTONE COMPOSITION WITH IMPROVED THERMOSTABILITY

[75] Inventors: Yukio Shimosaka; Sumimichi Ueda; Shigeru Nakajima, all of Okayama, Japan

[73] Assignee: Japan Exlan Company Limited, Osaka, Japan

[22] Filed: July 20, 1972

[21] Appl. No.: 273,458

[52] U.S. Cl. .......................................... 260/45.8 N
[51] Int. Cl. ............................................. C08g 51/58
[58] Field of Search ............................. 260/45.8 N

[56] References Cited
UNITED STATES PATENTS

| 2,476,422 | 7/1949 | Leininger | 260/45.8 N |
| 2,658,055 | 11/1953 | Alderson | 260/78.3 UA |
| 3,316,207 | 4/1967 | Hermann et al. | 260/45.8 N |
| 3,352,771 | 11/1967 | Anspon | 260/45.8 N |
| 3,491,114 | 1/1970 | Suh | 260/45.8 N |
| 3,644,279 | 2/1972 | Mathis et al. | 260/45.8 N |

Primary Examiner—Donald E. Czaja
Assistant Examiner—M. J. Welsh
Attorney—E. F. Wenderoth, John T. Miller and Matthew M. Jacob et al.

[57] ABSTRACT

A polypivalolactone composition is produced by mixing a polypivalolactone with one or more indole derivatives having a boiling point not less than 260°C. The composition has an improved stability against disintegration or decomposition of the polymer molecules at elevated temperatures.

10 Claims, No Drawings

POLYPIVALOLACTONE COMPOSITION WITH IMPROVED THERMOSTABILITY

This invention relates to a polypivalolactone composition having an improved thermal stability, and more particularly to a polypivalolactone composition which comprises a polypivalolactone and one or more indole derivatives represented by the general formula

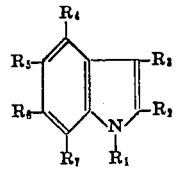

wherein each of $R_1$, $R_2$ and $R_3$ is hydrogen or a hydrocarbon group having 1 to 12 carbon atoms and each of $R_4$, $R_5$, $R_6$ and $R_7$ is hydrogen, a hydrocarbon group having 1 to 12 carbon atoms, alkoxy group having 1 to 6 carbon atoms, nitro group or halogen and having a boiling point not lower than 260°C.

As well known, a polypivalolactone is very useful as a polymer for making fibers, films and other shaped articles having excellent properties but has a disadvantage that it lacks a stability against heat applied in the process for producing such articles. Thus the polymer is oxidized or degraded by heat necessarily applied the course of injection-molding, extrusion-molding or fiber forming step. Particularly when the polymer is exposed to heat above the melting point, it is remarkably oxidized, degraded or decomposed, the molecular weight is reduced, and the color and physical properties of the articles shaped therefrom are deteriorated.

Therefore, various methods of thermostabilizing such polypivalolactone have been proposed. For example, it has been proposed to add an aromatic amine selected from β-naphthylamine, phenothiazine and m-aminophenol to the polymer (Japanese Patent Publication No. 29991/1969). It is also known to add an aliphatic mercaptan or aromatic mercaptan to such polymer (Japanese Patent Publication No. 9471/1970). However, such known methods are not satisfactory because a large amount of the stabilizer is required to stabilize the polypivalolactone against heat and because the stabilizer itself has a bad smell and undesirable color.

We have now found that a polypivalolactone can be thermally remarkably stabilized when it is combined with one or more indole derivatives quite different from the above mentioned known stabilizers, represented by the following general formula:

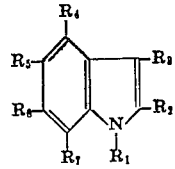

wherein each of $R_1$, $R_2$ and $R_3$ is hydrogen or a hydrocarbon group having 1 to 12 carbon atoms and each of $R_4$, $R_5$, $R_6$ and $R_7$ is hydrogen, a hydrocarbon group having 1 to 12 carbon atoms, alkoxy group having 1 to 6 carbon atoms, nitro group or halogen and having a boiling point not lower than 260°C.

Therefore, an object of the present invention is to add one or more indole derivatives to a polypivalolactone so that the disintegration or decomposition of the polymer molecules at elevated temperatures, for example, the reduction of the molecular weight and the coloring is prevented.

Another object of the present invention is to provide a polypivalolactone composition which is excellent in stability against heat and is suitable for the production of fibers, films and other shaped articles.

Other objects of the present invention will become apparent from the following description.

The above mentioned objects of the present invention are attained by adding one or more compositions selected from indole derivatives represented by the above indicated general formula and having a boiling point not lower than 260°C. to a polypivalolactone.

The polypivalolactone is to be used in the present invention is a linear polymer consisting substantially of a recurring ester structure unit of the formula $$\left[ -CH_2-\underset{\underset{CH_3}{|}}{\overset{\overset{CH_3}{|}}{C}}-COO- \right]$$

and can be easily produced by the polymerization of hydroxy-pivalic acid or its esters as disclosed in U.S. Pat. NO. 2,658,055 or by the polymerization of pivalolactone as disclosed in British Patent No. 766,347.

Further, it is also possible to use copolymer made by copolymerizing not more than 25 mol percent of such lactone as, for example, β-propiolactone, α,α-diethyl-β-propiolactone or ε-caprolactone with not less than 75 mol percent pivalolactone.

It is preferable that such polypivalolactone to be used in the present invention has an inherent viscosity ($\eta$ inh) of not less than 1.

Further, such polypivalolactone may well contain additives having no substantial adverse influence on the properties of the polypivalolactone, such as any other polymer, dye, pigment and stabilizer together with the stabilizer according to the present invention.

It is presumed that such polypivalolactone is subjected not only to a thermal decomposition at a high temperature but also to such oxidization and decomposition as are shown in the following at a high temperature in the presence of oxygen. The indole derivative according to the present invention efficiently inhibits such decomposition.

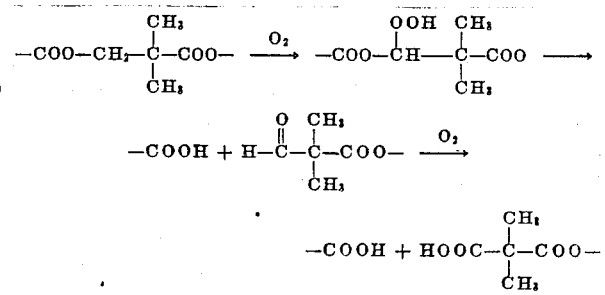

The indole derivative to be used in the present invention is a compound represented by the general formula

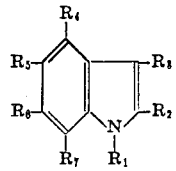

wherein each of $R_1$, $R_2$ and $R_3$ is hydrogen or a hydrocarbon group having 1 to 12 carbon atoms and each of $R_4$, $R_5$, $R_6$ and $R_7$ is hydrogen, a hydrocarbon group having 1 to 12 carbon atoms, alkoxy group having 1 to 6 carbon atoms, nitro group or halogen and having particularly a boiling point not lower than 260°C.

The indole derivatives which satisfies the above general formula but has a boiling point lower than 260°C. will be volatilized or cause foaming when the polypivalolactone is heated (melted) and is therefore undesirable.

In the above general formula for the indole derivatives, the hydrocarbon group having 1 to 12 carbon atoms for $R_1$, $R_2$, $R_3$, $R_4$, $R_5$, $R_6$ or $R_7$ is preferably an alkyl, aryl, aralkyl or alkylaryl group having 1 - 12 carbon atoms. Further, the halogen to be used is chlorine or bromine.

Examples of these indole derivatives are 1-propylindole, 1-isopropylindole, 1-butylindole, 1-isobutylindole, 1-amylindole, 1-phenylindole, 1-benzylindole, 2-methylindole, 2-ethylindole, 2-propylindole, 2-phenylindole, 2-tolylindole, 2-benzylindole, 3-ethylindole, 3-propylindole, 3-butylindole, 3-pentylindole, 3-benzylindole, 3-phenylindole, 4-methylindole, 5-methylindole, 5-ethoxyindole, 6-pentylindole, 1-methyl-2-isopropylindole, 1,2,5-trimethylindole, 1,3-dimethyl-2-ethylindole, 1-phenyl-2,3-dimethylindole, 1-ethyl-2-methylindole, 1-ethyl-2-tolylindole, 1-ethyl-2,5-dimethylindole, 2-methyl-3-ethylindole, 2-methyl-3-propylindole, 2,3,5-trimethylindole, 2-methyl-3-benzylindole, 1,2-diphenylindole, 2,3-diphenylindole, 2,5-dimethyl-3-propylindole, 3-benzyl-5,6-dimethoxyindole, 2,3-dimethyl-6-nitroindole, 2,3-diisopropylindole, 2-phenyl-3-propylindole and 1-methyl-2,3-diphenylindole.

The preferable amount of such indole derivatives to be added to polypivalolactone may be determined depending on the degree of the objective thermostability or the kind of the polypivalolactone to be used which is, for example, a high molecular weight substance, low molecular weight substance or copolymer but is generally 0.01 to 10 percent or particularly preferably 0.01 to 5 percent by weight on the polypivalolactone.

Any process may be used for incorporating the stabilizer to polypivalolactone so long as the stabilizer is well dispersed in the polypivalolactone. Thus, for example, a stabilizer may be dry-mixed with the polymer in a powder mixer in an ordinary manner or may be mixed with the polymer in a molding step by using an extruder or the like. Further, a powder polypivalolactone may be mixed with a solution of a stabilizer dissolved in a proper solvent and then the solvent may be evaporated to attain the dispersion of the stabilizer.

Even when heated for a long time in molding or shaping operation, the composition thus obtained according to the present invention is low in the reduction of the molecular weight of the polypivalolactone and in the heat deterioration so that it can be easily shaped into fibers, injection-molded or extrusion-molded to obtain shaped articles with excellent properties.

The invention will be further explained by means of the following Examples, but the scope of the invention is not limited to these specific examples. The parts and percentages in the examples are all by weight unless otherwise specified.

Further, the relative stability indicated in the examples is a value which is represented by the following formula and by which the effects of ths stabilizers can be compared as they are irrespective of the value of the inherent viscosity of the original polymer:

$$\frac{[\eta\ \text{inh}]_O - \frac{[\eta\ \text{inh}]_A}{[\eta\ \text{inh}]_O}}{[\eta\ \text{inh}]_O - \frac{[\eta\ \text{inh}]_B}{[\eta\ \text{inh}]_O}}$$

wherein $[\eta\ \text{inh}]_O$ designates an inherent viscosity of the original polymer, $[\eta\ \text{inh}]_A$ designates an inherent viscosity after the measurement of the thermostability when no stabilizer is added and $[\eta\ \text{inh}]_B$ designates an inherent viscosity after the measurement of the thermostability when a stabilizer is added. Thus, when such value of the relative stability is 1.00, there will be no stabilizing effect of the stabilizer, and the larger than 1.00 the value, the higher the thermostabilizing effect of the stabilizer.

EXAMPLES 1 to 13

0.01 part of each of stabilizers shown in Table 1 was dissolved in 3 parts of acetone, and 1 part of a polypivalolactone (homopolymer) of an inherent viscosity of 2.45 or 2.26 was mixed and dispersed in the solution. The thus obtained mixture was heated to evaporate and remove the solvent and was then well dried at 60°C. under a reduced pressure. Then this composition was treated for 15 minutes on a hot plate at 260°C. in air.

The inherent viscosity of the heat-treated composition was measured. The results are also shown in Table 1.

On the other hand, when the same heat-treatment was made without adding the stabilizer, the polypivalolactone of an inherent viscosity of 2.45 was reduced to be of an inherent viscosity of 2.26 was reduced to be of an inherent viscosity of 0.66.

From the results shown in Table 1, it was confirmed that various stabilizers according to the present invention are very effective for stabilizing polypivalolactones. By the way, the inherent viscosity $\eta\ \text{inh}$ (= $\ln \eta\text{rel}/c$) was determined at a concentration of 0.5 percent in $CF_3COOH$ at 30°C.

Table 1

| Example | Stabilizer | Inherent viscosity ($\eta\ \text{inh}$) before heat-treatment | inherent viscosity ($\eta\ \text{inh}$) after heat-treatment | relative stability |
|---|---|---|---|---|
| 1 | 2-phenylindole | 2.45 | 2.34 | 1.40 |
| 2 | 2,3-diphenylindole | 2.45 | 1.86 | 1.26 |
| 3 | 1-methyl-2,3-di-phenylindole | 2.26 | 1.61 | 1.27 |
| 4 | 2-phenyl-3-propylindole | 2.26 | 2.16 | 1.47 |
| 5 | 2,3-diisopropyl-indole | 2.26 | 1.73 | 1.32 |
| 6 | 3-benzyl-5,6-dimethoxyindole | 2.26 | 1.42 | 1.21 |
| 8 | 1-butylindole | 2.45 | 1.69 | 1.19 |
| 9 | 3-pentylindole | 2.45 | 1.24 | 1.08 |
| 10 | 1,2-dimethyl-5-chlorindole | 2.45 | 1.75 | 1.21 |
| 11 | 2,3,5-trimethyl-indole | 2.45 | 2.03 | 1.30 |
| 12 | 6-pentylindole | 2.45 | 1.44 | 1.13 |
| 13 | 2-methyl-3-octylindole | 2.45 | 1.73 | 1.21 |
|  | Controls (no stabilizer | 2.45 | 0.86 | 1.00 |

| was added) | 2.26 | 0.66 | 1.00 |

EXAMPLE 14

Polypivalolactone compositions were prepared and heat-treated according to the same procedure as in Examples 1 to 13 except that 2-phenylindole, 2,3-diphenylindole, 1-methyl-2,3-diphenylindole and 2-phenyl-3-propylindole were selected as stabilizers and the amount of addition was varied. The inherent viscosities after the heat-treatment are shown in Table 2.

TABLE 2

| Stabilizer | Amount (%) | inherent viscosity ($\eta$ inh) before heat-treatment | Inherent viscosity ($\eta$ inh) after heat-treatment | Relative stability |
|---|---|---|---|---|
| 2-phenylindole | 0.5 | 2.45 | 2.24 | 1.36 |
| 2,3-diphenyl-indole | 0.25 | " | 1.66 | 1.19 |
| " | 0.5 | " | 2.38 | 1.42 |
| " | 3.0 | " | 1.79 | 1.22 |
| " | 5.0 | " | 1.69 | 1.19 |
| 1-methyl-2,3-diphenylindole | 3.0 | 2.26 | 2.03 | 1.45 |
| 2-phenyl-3-propylindole | 0.5 | " | 2.01 | 1.44 |
| " | 3.0 | " | 2.14 | 1.50 |

EXAMPLE 15

1 part of 2-phenyl-3-propylindole as a stabilizer was well dry-mixed with 100 parts of a pivalolactone homopolymer of an inherent viscosity of 2.40 in a powder mixer.

The thus obtained polypivalolactone composition was extruded as a melt through spinning orifices of an origice diameter of 0.3 mm. at a temperature of 260°C. under a pressure of 40 kg./cm.². The formed filaments were taken up on a roller at a winding velocity of 100 m./min. Then the filaments were stretched and heat-treated to obtain polypivalolactone fibers. The inherent viscosity of the resulting fibers was 2.29.

On the other hand, polypivalolactone fibers were made by the same process as above except that no stabilizer was added. The inherent viscosity of said fibers was 1.33.

What is claimed is:

1. A polypivalolactone composition which comprises a polypivalolactone and one or more indole derivatives represented by the general formula

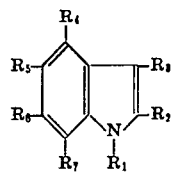

wherein each of $R_1$, $R_2$ and $R_3$ is hydrogen or a hydrocarbon or a hydrocarbon group having 1 to 12 carbon atoms and each of $R_4$, $R_5$, $R_6$ and $R_7$ is hydrogen, a hydrocarbon group having 1 to 12 carbon atoms, alkoxy group having 1 to 6 carbon atoms, nitro group or halogen and having a boiling point not lower than 260°C.

2. A polypivalolactone composition according to claim 1 wherein the amount of the indole derivative is 0.001 to 10 percent by weight on the polypivalolactone.

3. A polypivalolactone composition according to claim 2 wherein the amount of the indole derivative is 0.01 to 5 percent by weight on the polypivalolactone.

4. A polypivalolactone composition according to claim 1 wherein the above mentioned indole derivative has at least hydrocarbon group substituent having 1 to 12 carbon atoms.

5. A polypivalolactone composition according to claim 4 wherein the hydrocarbon group is selected from the group consisting of alkyl groups, aryl groups, aralkyl groups and alkylaryl groups.

6. A polypivalolactone composition according to claim 1 wherein the above mentioned indole derivative is a compound selected from the group consisting of 1-butyl-indole, 3-pentylindole, 6-pentylindole, 2-phenylindole, 2,3-diphenylindole, 2,3-diisopropylindole, 2-methyl-3-octylindole, 2-phenyl-3-propylindole, 2,3,5-trimethylindole, 1-methyl-2,3-diphenylindole, 2,3-dimethyl-6-nitroindole, 3-benzyl-5,6-dimethyoxyindole and 1,2-dimethyl-5-chlorindole.

7. A polypivalolactone composition according to claim 1 wherein said polypivalolactone is a linear polyester consisting substantially of a recurring unit of the formula

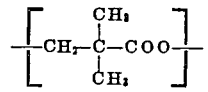

8. A polypivalolactone composition according to claim 7 wherein said polypivalolactone is a pivalolactone homo- or copolymer.

9. A polypivalolactone composition according to claim 8 wherein said pivalolactone copolymer is a copolymer consisting of at least 75 mol percent pivalolactone and not more than 25 mol percent of another lactone.

10. A polypivalolactone composition according to claim 7 wherein said polypivalolactone has an inherent viscosity of at least 1.